Patented July 16, 1940

2,208,331

UNITED STATES PATENT OFFICE 2,208,331

MANUFACTURE OF RESINS

John F. Olin, Grosse Ile, Mich., assignor to The Sharples Solvents Corporation, Philadelphia, Pa.

No Drawing. Application September 9, 1937, Serial No. 163,091

6 Claims. (Cl. 260—53)

The present invention relates to synthetic resins and to the production of such resins by the condensation of phenolic compounds with aldehydes or other compounds containing reactive methylene. It is well known that condensation reactions of this character can be performed in the presence of suitable catalysts.

It is also known that, when phenolic compounds (such as phenol, cresol, thymol, resorcinol, hydroquinone, pyrocatechol etc.) are reacted with an aliphatic compound containing four or more carbon atoms (such as butylene, amylene, hexylene, heptylene or the corresponding chlorides or alcohols or the corresponding cycloaliphatic compounds; e. g., cyclohexene or cyclohexyl chloride) to produce a nuclear substituted alkyl phenol containing three or more carbon atoms in its substituent alkyl radical, the resulting substituted phenolic compound may be condensed with aldehydes or equivalent compounds to produce resins which are superior to resins produced from unsubstituted phenol in that they are soluble in drying oils and hydrocarbon oils.

This subject matter is disclosed in the German patent to Bakelite Gesellschaft No. 340,989 of September 20, 1921.

The process described in German Patent No. 340,989 results in the production of resins which are desirable for the production of varnishes because of their oil solubility. The present invention relates to the performance of condensation reactions and the production of resins of the general character of those forming the subject matter of the above German patent. In the practice of the present invention, however, the resins are produced from a cheaper source of raw material than are the resins of the German patent. In the production of phenols substituted by a single alkyl radical (where the term "alkyl" is used hereinafter, it is intended to be interpreted sufficiently broadly to include cycloalkyl radicals) a certain amount of phenolic material substituted by two or more alkyl radicals is inevitably produced depending upon the proportions of the phenolic compounds and the source of the alkyl radical (e. g., olefin, alkyl chloride or aliphatic alcohol) employed in the reaction mixture from which the alkyl phenol is produced. When the reaction is completed, and the phenolic compound substituted by a single alkyl radical is distilled from the mixture, this poly alkyl phenolic material remains as a residue in the still. In the production of mono alkyl phenols, whether these mono alkyl phenols are to be used in the preparation of resins, as germicides, as insecticides or for other purposes, a certain proportion of undesired poly alkyl phenolic material is accordingly produced. The purpose of the present invention has been to produce valuable resins from this byproduct, poly alkyl phenolic material.

When a phenolic compound substituted in the nucleus in its reactive (i. e., ortho and para) positions by two alkyl radicals is condensed with a methylene containing body such as formaldehyde, paraformaldehyde, hexamethylene tetramine etc., the resulting condensation product is a viscous oil, and not a solid resin such as is obtained by condensation of a para or ortho mono alkyl phenolic compound with the methylene containing body. An important object of the present invention has been to effect a condensation reaction in which dialkyl phenols of the above character containing four or more carbon atoms in each of their alkyl radicals may be condensed with methylene containing bodies to produce solid resins. The resins produced in accordance with the present invention are soluble in drying oils and hydrocarbon oils and are fusible under the influence of heat.

The present invention rests upon the discovery that, when dialkyl phenols such as discussed in the last paragraph above, are condensed with methylene containing bodies in the presence of a substantial proportion of phenol, or a substituted phenol in which not more than one of the particularly reactive positions (i. e., the ortho and para positions) is occupied by a substituent radical, a solid resin is produced, as contrasted with the viscous liquid condensation product obtained when the dialkyl phenol is condensed with the methylene containing body in the absence of the added phenol or substituted phenol. Thus, when di-tertiary amyl phenol is condensed with formaldehyde or its equivalent in the presence of ammonia, sodium hydroxide solution or equivalent basic, acid or neutral catalyst, the resulting condensation product is a viscous oil. When a proportion of unsubstituted phenol or of tertiary amyl phenol substituted only in a single ortho or para position, amounting to at least 20% of the quantity of di-tertiary amyl phenol to be condensed is added to the reaction mixture before the condensation reaction commences or during the course of the condensation reaction, the resulting condensation product is a solid, oil soluble, resin which may be advantageously used in the preparation of varnishes and lacquers and which is fusible when heated to a temperature of 50–100° C. Similar results may be obtained in condensing dialkyl phenolic compounds with formaldehyde or the like, in cases in which alkyl groups are butyl, amyl, hexyl, heptyl or cyclohexyl. The compounds added to the reaction mixture to modify the reaction and effect the production of solid resins may be simple phenol or other phenolic compounds such as naphthol, cresol, toluol, thymol, resorcinol, hydroquinone or the corresponding butyl, amyl, hexyl, heptyl or cycloalkyl mono-substituted phenols.

While I do not wish to be bound by any particular theory as to the reasons for the advantageous results obtained in the practice of the invention, I believe that the following theory may be the correct explanation for these results:

When a phenolic compound which is substituted in reactive positions in the nucleus by two or more radicals is reacted with a methylene containing body such as formaldehyde, the reaction may be indicated by the following equation:

I.

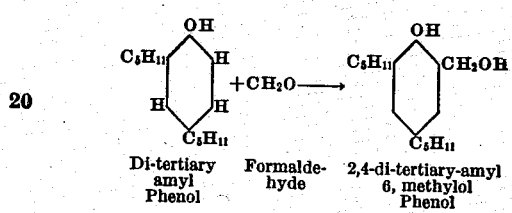

Di-tertiary amyl Phenol    Formaldehyde    2,4-di-tertiary-amyl 6, methylol Phenol When an attempt is made to convert the product 2, 4, ditertiaryamyl 6, methylol phenol into a solid resin by heating it, the heating step resulted in loss of formaldehyde and the production of a diphenyl methane derivative in accordance with the following equation in which R represents the di-tertiary amyl phenyl radical of the reaction product of Equation I:

II.    $2RCH_2OH \rightarrow R-CH_2-R + CH_2O + H_2O$

If, however, phenol is present in the reaction mixture, the following reactions probably take place:

III.

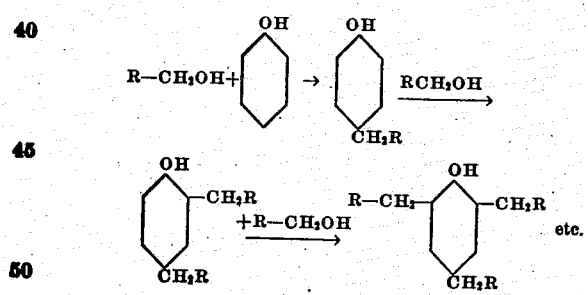

If mono-tertiary amyl phenol be present in the reaction mixture, the following reaction probably takes place:

IV.

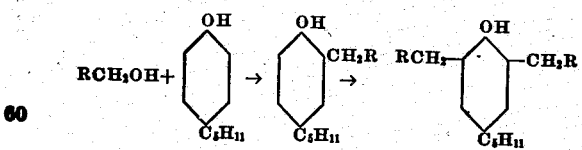

The reactions indicated at III and IV result in the production of solid resins and the attainment of the object of the invention.

Example 1

150 grams of diamyl phenol were mixed with 100 grams of formaldehyde. 25 grams of 50% sodium hydroxide solution were added to the mixture and the entire mass was thoroughly stirred. The mixture was allowed to stand overnight at a temperature of 50° C. 75 grams of phenol were then added, the material was again thoroughly mixed and allowed to stand for 72 hours at a temperature of 50° C. It was then washed successively with dilute hydrochloric acid and with water and heated to a temperature of 150° C. and maintained at that temperature for 45 minutes. A dark brown, slightly tacky resin was obtained which was soluble in China-wood oil and in benzene.

Example 2

The procedure of Example 1 was repeated except that the phenolic compound added to the mixture of diamyl phenol, formaldehyde and sodium hydroxide solution was cresol instead of phenol. The resulting resin was dark brown, but harder than the resin produced in Example 1.

Example 3

400 grams monoamyl phenol (mixture of ortho and para) and 150 g. diamyl phenol was added with stirring to 360 g. 40% formaldehyde in 360 g. alcohol. 90 g. 50% NaOH was added and the mixture cooled externally. After the initial reaction was over the material was kept in a warm place for 48 hours. On being worked up as before a good yield of brittle amber colored resin was obtained.

I claim:

1. A synthetic resin comprising the oil soluble solid product obtained by condensing with a methylene containing body a mixture of phenolic compounds consisting predominantly of a phenol substituted in at least two but not all of its reactive nuclear positions by alkyl radicals having at least four carbon atoms and of such character that it cannot be condensed alone with methylene containing bodies to produce a solid resin, and containing at least 20% of a mono-nuclear phenol having at least two of its ortho and para positions unsubstituted, and heating the resulting condensation product to effect hardening thereof.

2. A synthetic resin as defined in claim 1, in which the mono-nuclear phenol having at least two of its ortho and para positions unsubstituted is simple unsubstituted phenol.

3. A synthetic resin as defined in claim 1, in which the substituted phenolic compound contained in the mixture in a predominant proportion is di-tertiary amyl phenol.

4. A process of preparing an oil soluble solid synthetic resin which comprises the steps of condensing with a methylene containing body a mixture of phenolic compounds consisting predominantly of a phenol substituted in at least two but not all of its reactive nuclear positions by alkyl radicals having at least four carbon atoms and of such character that it cannot be condensed alone with methylene containing bodies to produce a solid resin, and containing at least 20% of a mono-nuclear phenol having at least two of its ortho and para positions unsubstituted, and heating the resulting condensation product to effect hardening thereof.

5. A process as defined in claim 4, in which the mono-nuclear phenol having at least two of its ortho and para positions unsubstituted is simple unsubstituted phenol.

6. A process as defined in claim 4, in which the substituted phenolic compound contained in the mixture in a predominant proportion is di-tertiary amyl phenol.

JOHN F. OLIN.